US006752448B1

United States Patent
Hsu

(10) Patent No.: US 6,752,448 B1
(45) Date of Patent: Jun. 22, 2004

(54) FUEL DOOR ASSEMBLY FOR AUTOMOBILE

(76) Inventor: Mei-Chin Hsu, 58, Ma Yuan West St., Taichung (TW)

( * ) Notice: Subject to any disclaimer, the term of this patent is extended or adjusted under 35 U.S.C. 154(b) by 0 days.

(21) Appl. No.: 10/444,724

(22) Filed: May 22, 2003

(51) Int. Cl.$^7$ .............................................. B60K 15/05
(52) U.S. Cl. ..................... 296/97.22; 220/86.2; 280/834
(58) Field of Search ..................... 220/86.2; 296/97.22; 280/834

(56) References Cited

U.S. PATENT DOCUMENTS 1,031,283 A * 7/1912 Mullineux ................. 220/86.2
2,663,447 A * 12/1953 Westcott ..................... 220/326
6,352,295 B1 * 3/2002 Leitner ..................... 296/97.22

* cited by examiner

Primary Examiner—Dennis H. Pedder

(57) ABSTRACT

A fuel door assembly includes an annular support seat, a torsion spring, and a pivot cover. Thus, the fuel door assembly that, when being opened, can be positioned rigidly without collapse, thereby facilitating the fuel filling operation. In addition, when the pivot cover is pivoted relative to the support seat to move to the opened position, the operation section of the torsion spring is urged on the corner of the press block of the pivot base of the pivot cover by the restoring force of the torsion spring, so that the pivot cover is positioned on the support seat rigidly and stably without collapse and detachment.

15 Claims, 6 Drawing Sheets

FUEL DOOR ASSEMBLY FOR AUTOMOBILE

BACKGROUND OF THE INVENTION

1. Field of the Invention

The present invention relates to a fuel door assembly, and more particularly to a fuel door assembly for an automobile.

2. Description of the Related Art

A conventional fuel door assembly for an automobile in accordance with the prior art comprises a housing, a compression spring, a plunger, and a fuel door. The housing has a side formed with a socket, and the compression spring and the plunger are mounted in the socket ,of the housing with the compression spring being biased between the plunger and the socket of the housing. The fuel door has an end pivotally mounted on the housing and having a bottom rested on the plunger. Thus, the fuel door, when being opened, can be positioned on the housing by the force of lithe compression spring. However, the compression spring easily produces fatigue during a long-term utilization, thereby affecting combination of the fuel door with the housing.

SUMMARY OF THE INVENTION

The primary objective of the present invention is to provide a fuel door assembly that, when being opened, can be positioned rigidly and stably without collapse, thereby facilitating the fuel filling operation.

Another objective of the present invention !is to provide a fuel door assembly, wherein when the pivot cover is pivoted relative to the support seat to move to the opened position, the operation section of the torsion spring is urged on the corner of the press block of the pivot base of the pivot cover by the restoring force of the torsion spring, so that the pivot cover is positioned on the support seat rigidly and stably without collapse and detachment.

In accordance with the present invention, there is provided a fuel door assembly, comprising an annular support seat a torsion spring, and a pivot cover, wherein:

the support seat has an inner wall formed with a support base;

the torsion spring is pivotally mounted on the support base of the support seat and has a mediate portion formed with a protruding operation section; and the pivot cover is pivotally mounted on the support seat and has a side provided with a pivot base formed with a protruding press block rested on the operation section of the torsion spring.

Further benefits and advantages of the present invention will become apparent after a careful reading of the detailed description with appropriate reference to the accompanying drawings.

DETAILED DESCRIPTION OF THE INVENTION

Figure 1:
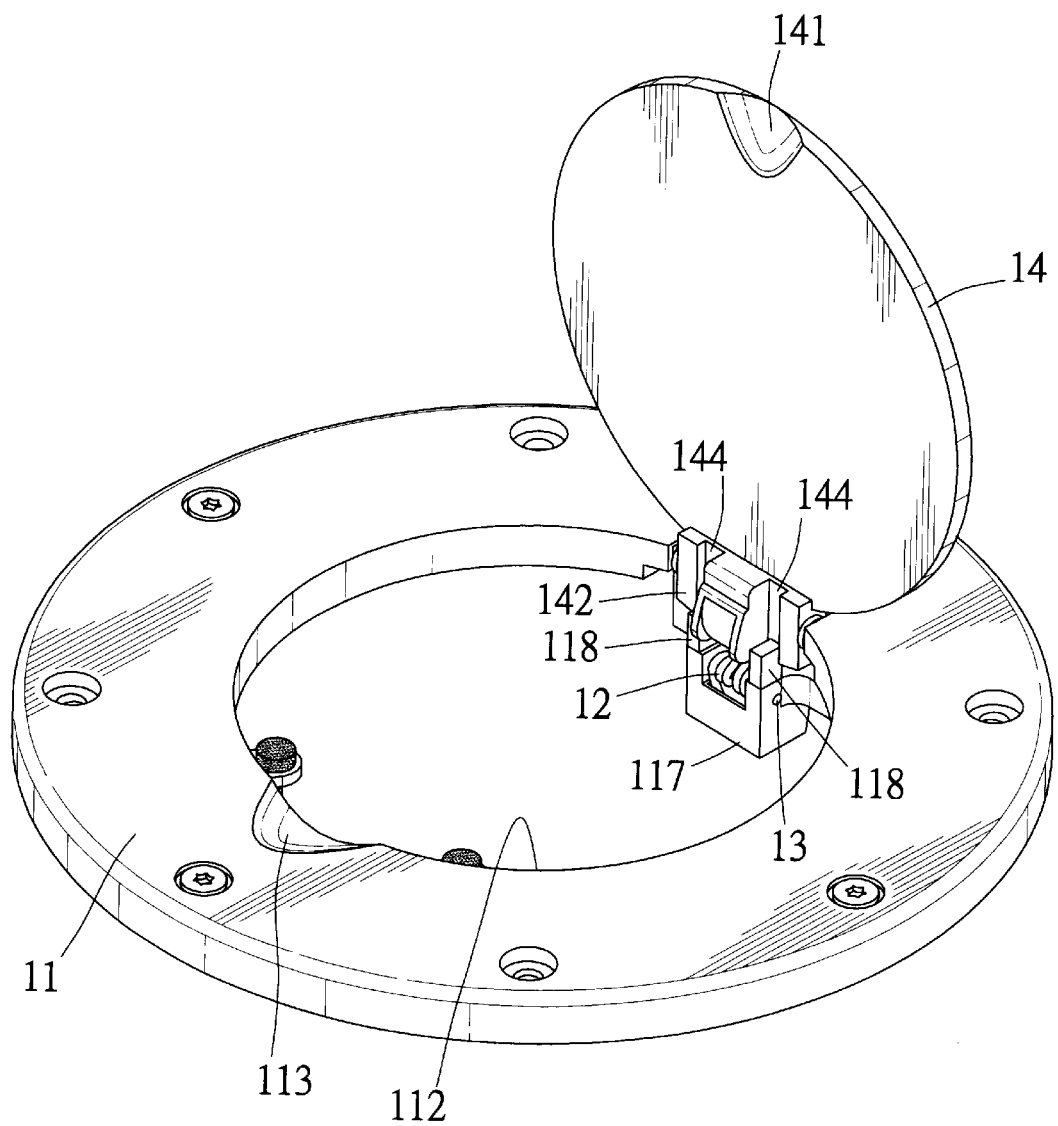
FIG. 1 is a perspective view of a fuel door assembly in accordance with the preferred embodiment of the present invention.
Figure 2:
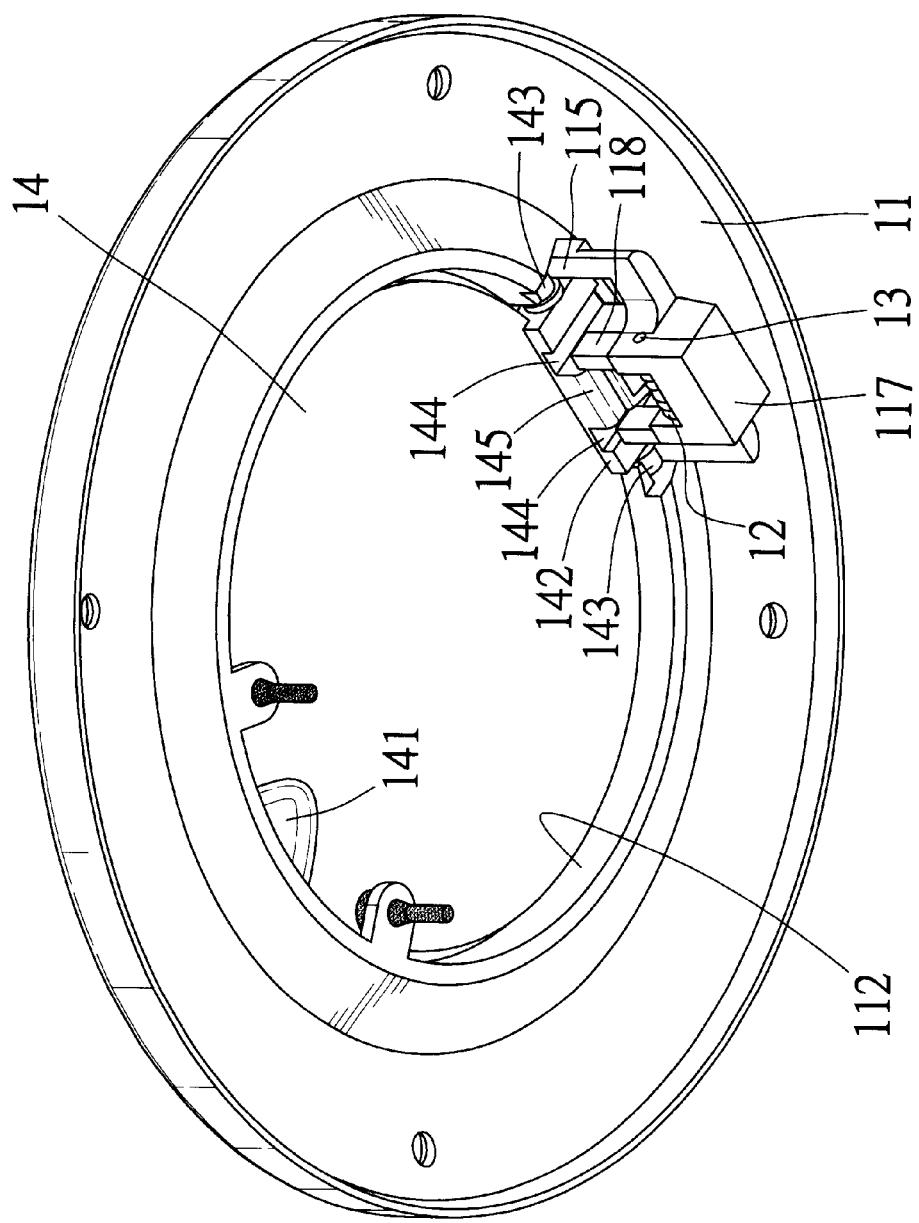
FIG. 2 is a perspective view of the fuel door assembly in accordance with the preferred embodiment of the present invention.

Referring to the drawings and initially to FIGS. 1–6, a fuel door assembly for an automobile in accordance with the preferred embodiment of the present invention comprises an annular support seat 11, a torsion spring 12, a pivot shaft 13, and a pivot cover 14.

The support seat 11 is fixed on a fuel opening "a" (see FIG. 5) of the body of the automobile by a plurality of screw members 111. The support seat 11 has an inner wall formed with two extension portions 115 each extending outward, and a substantially U-shaped support base 117 located between the two extension portions 115. Each of the two extension portions 115 of the support seat 11 is formed with an insertion groove 116. The support base 117 of the support seat 11 has two sides each having a top provided with a protruding limit block 118. Each of the two sides of the support base 117 of the support seat 11 is formed with a through hole 110. The support base 117 of the support seat 11 has a center formed with a receiving chamber 119. The inner wall of the support seat 11 is formed with a receiving hole 112 and a cutout 113. The inner wall of the support seat 11 is formed with a substantially U-shaped receiving space 114.

The torsion spring 12 is pivotally mounted on the support base 117 of the support seat 11. The torsion spring 12 has two ends each formed with an insertion section 122 secured in the receiving chamber 119 of the support base 117 of the support seat 11, and a mediate portion formed with a protruding operation section 123. The torsion spring 12 is formed with a through hole 121 aligning with the through holes 110 of the support base 117 of the support seat 11.

The pivot shaft 13 is in turn extended through the through holes 110 of the support base 117 of the support seat 11 and the through hole 121 of the torsion spring 12, so that the torsion spring 12 is pivotally mounted on the support base 117 of the support seat 11.

The pivot cover 14 is pivotally mounted on the support seat 11. Preferably, the pivot cover 14 is pivotally mounted in the receiving hole 112 of the support seat 11. The pivot cover 14 has a side provided with a pivot base 142 pivotally mounted in the receiving space 114 of the support seat 11.

The pivot base 142 of the pivot cover 14 has two sides each provided with a pivot axle 143 pivotally mounted in the respective insertion groove 116 of the support seat 11, so that the pivot cover 14 is pivotally mounted on the support seat 11. The pivot cover 14 is formed with al cutout 141 aligning with the cutout 113 of the support seat 11. The pivot base 142 of the pivot cover 14 is formed with two spaced parallel limit slots 144, and the limit block 118 of the support base 117 of the support seat 11 is received in a respective one of the two limit slots 144 of the pivot base 142 of the pivot cover 14.

The pivot base 142 of the pivot cover 14 is formed with a protruding press block 145 rested on the operation section 123 of the torsion spring 12. Preferably, the press block 145 of the pivot base 142 of the pivot cover 14 has an arcuate configuration. The press block 145 of the pivot base 142 of the pivot cover 14 is formed with a receiving recess 146 to receive the operation section 123 of the torsion spring 12. The press block 145 of the pivot base 142 of the pivot cover 14 is located between the two limit slots 114.

Figure 4:
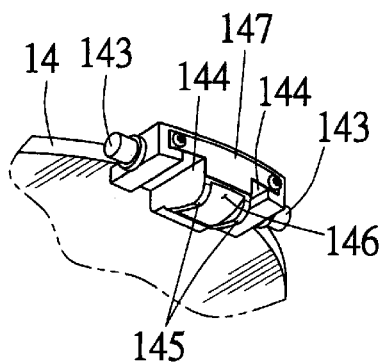
FIG. 4 is a partially cut-away bottom perspective view of a pivot cover of the fuel door assembly in accordance with the preferred embodiment of the present invention.
Figure 3:
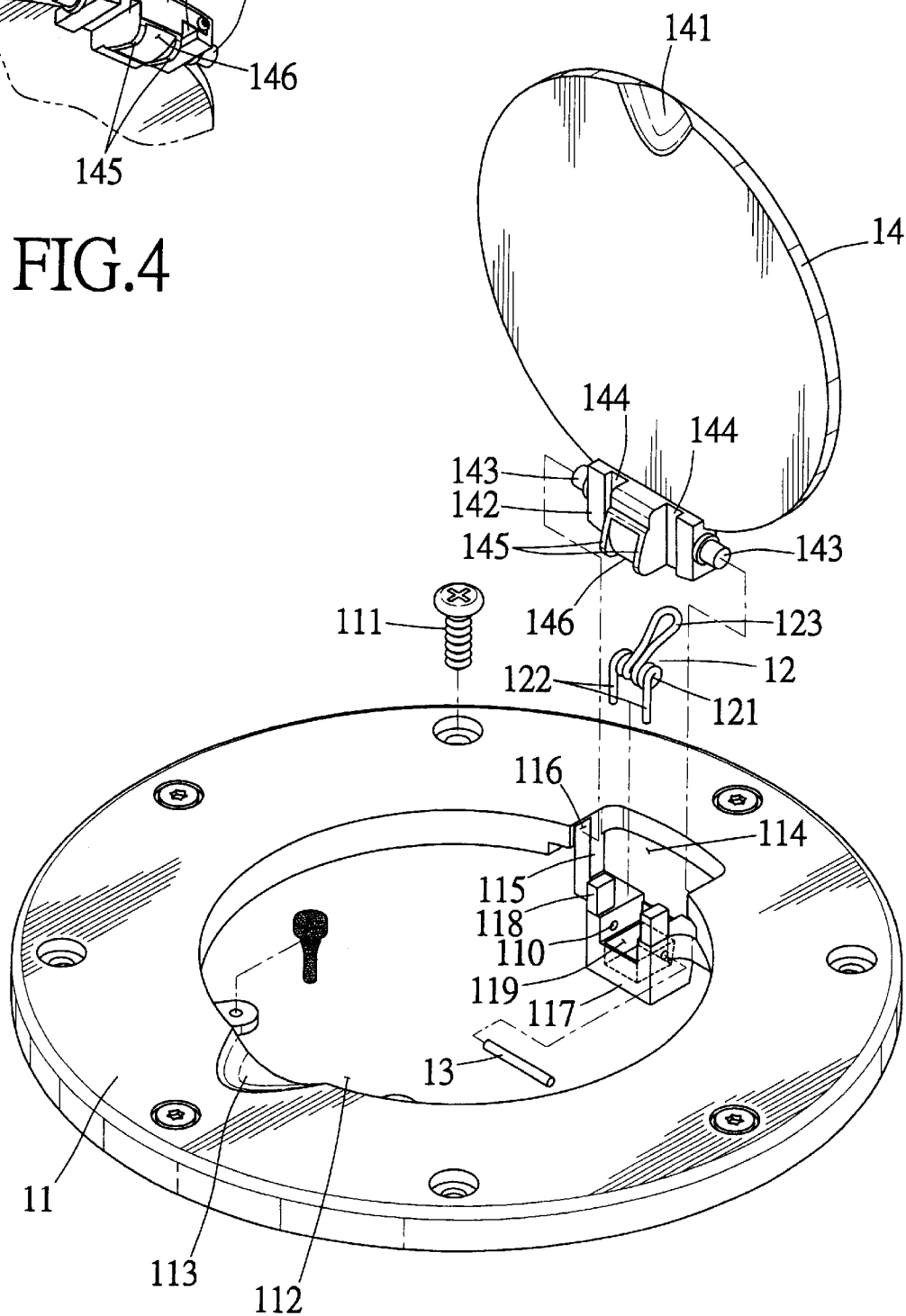
FIG. 3 is an exploded perspective view of the fuel door assembly in accordance with the preferred embodiment of the present invention.

The pivot base 142 of the pivot cover 14 has an outer end bonded with a wear-resistant plate 147 (see FIG. 4).

Figure 5:
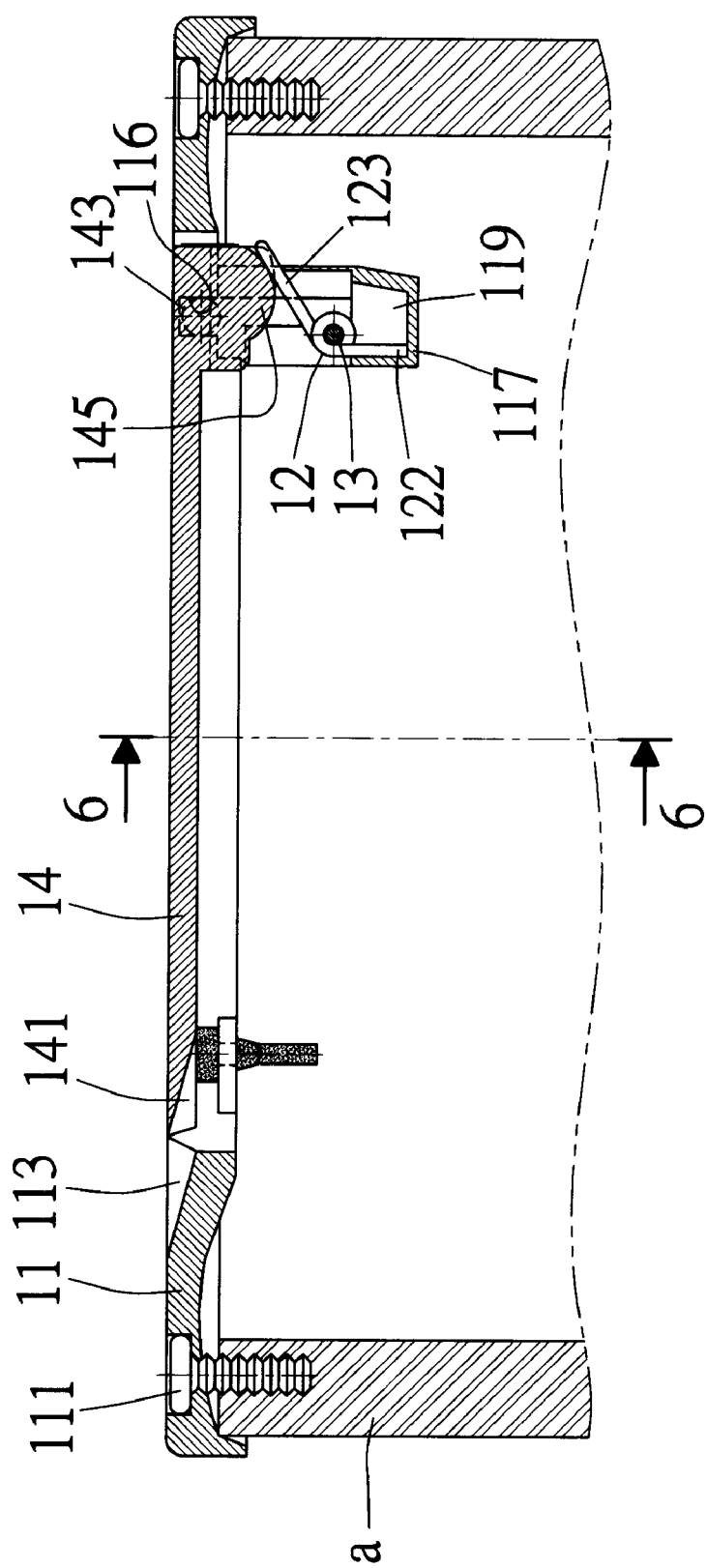
FIG. 5 is a side plan cross-sectional view of the fuel door assembly as shown in FIG. 1.
Figure 6:
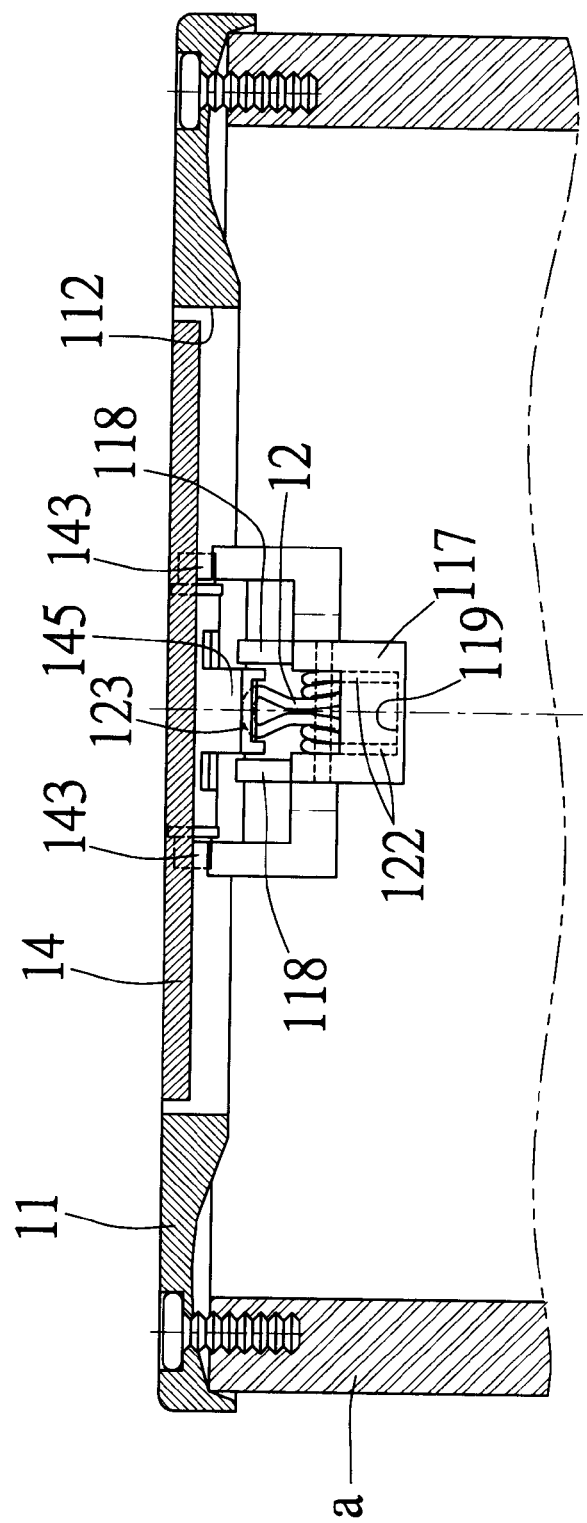
FIG. 6 is a plan cross-sectional view of the fuel door assembly taken along line 6—6 as shown in FIG. 5.
Figure 7:
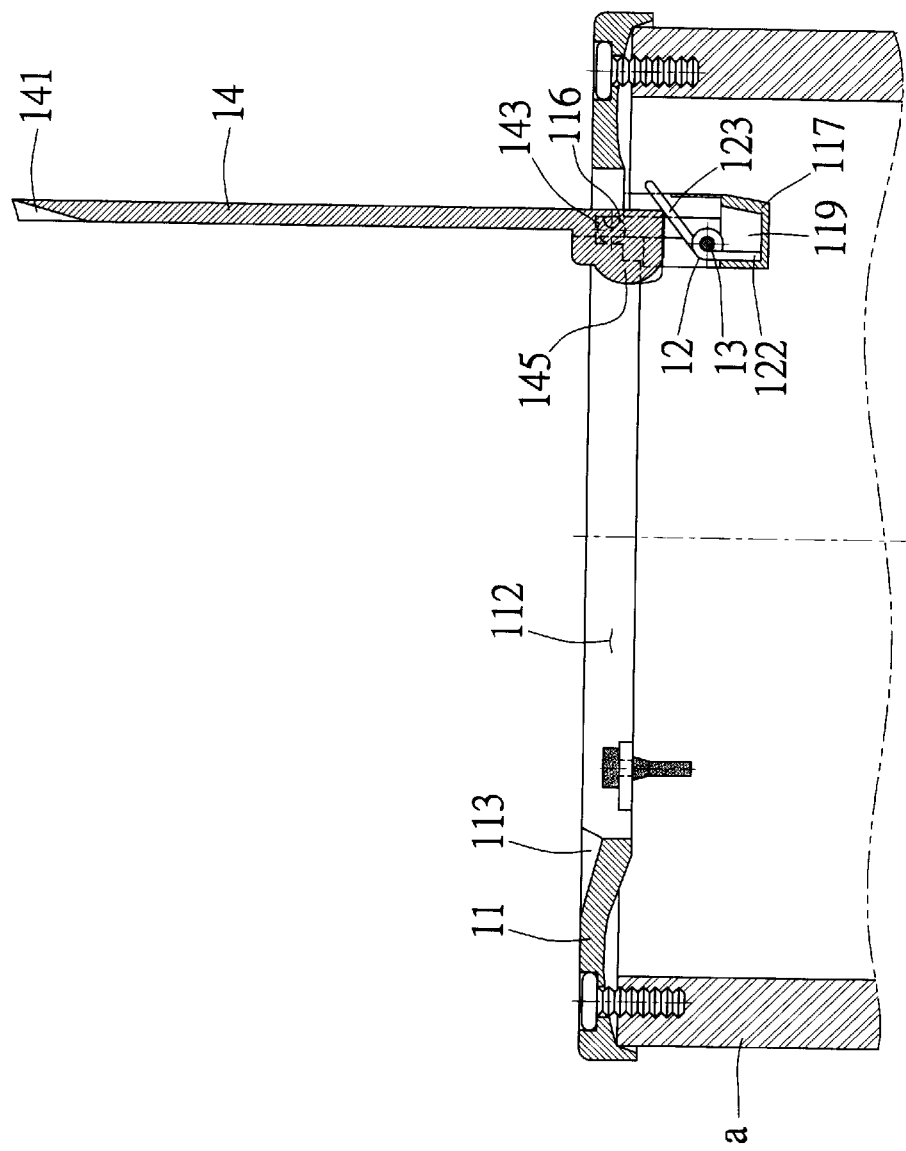
FIG. 7 is a schematic operational view of the fuel door assembly as shown in FIG. 5 in use.

In operation, referring to FIGS. 5–7 with reference to FIGS. 1–4, when the pivot cover 14 is mounted on the support seat 11, the operation section 123 of the torsion spring 12 is pressed by the press block 145 of the pivot base 142 of the pivot cover 14 as shown in FIG. 5. When the pivot cover 14 is pivoted relative to the support seat 11 to move from the position as shown in FIG. 5 to the position as shown in FIG. 7, the operation section 123 of the torsion spring 12 is urged on the corner of the press block 145 of the pivot base 142 of the pivot cover 14 by the restoring force of the torsion spring 12, so that the pivot cover 14 is retained on the support seat 11 rigidly and stably without collapse and detachment.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A fuel door assembly, comprising an annular support seat, a torsion spring, and a pivot cover, wherein:

the support seat has an inner wall formed With a support base;

the torsion spring is pivotally mounted on the support base of the support seat and has a mediate portion formed with a protruding operation section; and the pivot cover is pivotally mounted on the support seat and has a side provided with a pivot base formed with a protruding press block rested on the operation section of the torsion spring.

2. The fuel door assembly in accordance with claim 1, wherein the support base is substantially U-shaped.

3. The fuel door assembly in accordance with claim 1, wherein the inner wall of the support seat is formed with two extension portions each extending outward, and the support base is located between the two extension portions.

4. The fuel door assembly in accordance with claim 3, wherein each of the two extension portions of the support seat is formed with an insertion groove, and the pivot base of the pivot cover has two sides each provided with a pivot axle pivotally mounted in the respective insertion groove of the support seat, so that the pivot cover is pivotally mounted on the support seat.

5. The fuel door assembly in accordance with claim 1, wherein the pivot base of the pivot cover is formed with two spaced parallel limit slots, and the support base of the support seat has two sides each having a top provided with a protruding limit block received in a respective one of the two limit slots of the pivot base of the pivot cover.

6. The fuel door assembly in accordance with claim 5, wherein the press block of the pivot base of the pivot cover is located between the two limit slots.

7. The fuel door assembly in accordance with claim 1, wherein each of the two sides of the support base of the support seat is formed with a through hole, the torsion spring is formed with a through hole aligning with the through holes of the support base of the support seat, and the fuel door assembly further comprises a pivot shaft is in turn extended through the through holes of the support base of the support seat and the through hole of the torsion spring, so that the torsion spring is pivotally mounted on the support base of the support seat.

8. The fuel door assembly in accordance with claim 1, wherein the support base of the support seat has a center formed with a receiving chamber, and the torsion spring has two ends each formed with an insertion section secured in the receiving chamber of the support base of the support seat.

9. The fuel door assembly in accordance with claim 1, wherein the inner wall of the support seat is formed with a receiving hole, and the pivot cover is pivotally mounted in the receiving hole of the support seat.

10. The fuel door assembly in accordance with claim 1, wherein the inner wall of the support seat is formed with a cutout.

11. The fuel door assembly in accordance with claim 10, wherein the pivot cover is formed with a cutout aligning with the cutout of the support seat.

12. The fuel door assembly in accordance with claim 1, wherein the inner wall of the support seat is formed with a substantially U-shaped receiving space, and the pivot base of the pivot cover is pivotally mounted in the receiving space of the support seat.

13. The fuel door assembly in accordance with claim 1, wherein the press block of the pivot base of the pivot cover has an arcuate configuration.

14. The fuel door assembly in accordance with claim 1, wherein the press block of the pivot base of the pivot cover is formed with a receiving recess to receive the operation section of the torsion spring.

15. The fuel door assembly in accordance with claim 1, wherein the pivot base of the pivot cover has an outer end bonded with a wear-resistant plate.

* * * * *